(12) United States Patent
Tsai

(10) Patent No.: US 9,452,707 B1
(45) Date of Patent: Sep. 27, 2016

(54) VEHICLE LIGHT APPARATUS

(71) Applicant: Lucidity Enterprise Co., Ltd., Tainan (TW)

(72) Inventor: Hsi-Hsien Tsai, Tainan (TW)

(73) Assignee: LUCIDITY ENTERPRISE CO., LTD., Tainan (TW)

(*) Notice: Subject to any disclaimer, the term of this patent is extended or adjusted under 35 U.S.C. 154(b) by 0 days.

(21) Appl. No.: 14/753,673

(22) Filed: Jun. 29, 2015

(51) Int. Cl.
*F21V 9/00* (2015.01)
*B60Q 1/30* (2006.01)
*F21S 8/10* (2006.01)
*B60Q 1/26* (2006.01)
*B60Q 1/00* (2006.01)
*B60Q 1/44* (2006.01)

(52) U.S. Cl.
CPC ............... *B60Q 1/30* (2013.01); *B60Q 1/0035* (2013.01); *B60Q 1/2607* (2013.01); *B60Q 1/2619* (2013.01); *B60Q 1/44* (2013.01); *F21S 48/212* (2013.01); *F21S 48/215* (2013.01); *F21S 48/225* (2013.01); *F21S 48/2237* (2013.01); *F21S 48/2262* (2013.01); *F21S 48/2281* (2013.01); *F21S 48/2293* (2013.01); *F21S 48/23* (2013.01)

(58) Field of Classification Search
CPC ............... H01L 2224/48091; H01L 2924/00; F21Y 2101/02
USPC ............... 362/511, 509, 543, 544
See application file for complete search history.

(56) References Cited

U.S. PATENT DOCUMENTS 7,497,606 B1   3/2009   Tsai et al.

*Primary Examiner* — Vip Patel
(74) *Attorney, Agent, or Firm* — DLA Piper LLP (US)

(57) ABSTRACT

A vehicle light apparatus includes a light housing unit having a first outer surface and a second outer surface facing laterally, a light-emitting module having a plurality of main lighting elements and a side market lighting element, and a side light guide member. The side light guide member includes a light-receiving segment, and a light-transmitting segment extending from the light-receiving segment toward the second outer surface, and having a light-reflecting surface capable of reflecting light emitted from the side marker lighting element toward the second outer surface such that the light is transmitted via the light-receiving segment and the light-transmitting segment.

11 Claims, 6 Drawing Sheets

VEHICLE LIGHT APPARATUS

FIELD

The disclosure relates to a vehicle light apparatus, and more particularly to a vehicle light apparatus with brake light, tail light, back-up light, side market light, turn signal light and license-plate light functions.

BACKGROUND

U.S. Pat. No. 7,497,606 discloses a reflective rear light for a truck. The reflective rear light includes a light housing, a circuit board disposed in the light housing, a reflection plate unit mounted to the light housing, and a lens disposed in front of the reflection plate unit. The circuit board is provided with a plurality of light emitting diodes, and is divided into a main light region, a license plate light region and a side marker light region. The reflection plate unit includes a main reflecting plate for reflecting light from the main light region, a license plate reflecting plate for reflecting light from the license plate light region, and a side reflecting plate for reflecting light from the side marker light region laterally. The light regions of the light housing and the reflection plate unit are designed in such a way that the reflective rear light serves as a warning light, a license plate light and a side marker light.

In greater detail, the side reflecting plate and the license plate reflecting plate are configured with a plurality of reflecting surfaces having specific design and predetermined curvatures for collecting and redirecting the light to a desired direction and for illuminating a targeted area. However, it is difficult to properly control the direction of the light reflected from the reflecting surfaces in actual use, and such configuration is incapable of providing long-distance illumination. Besides, a relatively large space for accommodating the reflection plate unit is required for proper light reflection, thereby undesirably increasing the overall size of the reflective rear light.

SUMMARY

Therefore, an object of the disclosure is to provide a vehicle light apparatus that have a relatively compact overall size.

According to the disclosure, the vehicle light apparatus includes a light housing unit, a light-emitting module and a light guiding unit.

The light housing unit defines a chamber, and includes a first outer surface aligned with the chamber along a front-rear direction, and a second outer surface aligned with the chamber along a left-right direction.

The light-emitting module is disposed in the chamber of the light housing unit, and includes a circuit board, at least one main lighting element that is mounted to the circuit board and that faces the first outer surface, and a side marker lighting element that is mounted to the circuit board. The circuit board has a first side surface facing the first outer surface, a second side surface opposite to the first side surface, and opposite first and second lateral surfaces interconnecting the first and second side surfaces. The second lateral surface is adjacent to the second outer surface of the light housing unit.

The light guiding unit is disposed in the chamber and includes a side light guide member that is adjacent to the second lateral surface. The side light guide member includes a light-receiving segment and a light-transmitting segment. The light-receiving segment extends from the side marker lighting element in a direction away from the first outer surface. The light-transmitting segment extends from the light-receiving segment of the side light guide member toward the second outer surface of the light housing unit, and has a side light-projecting surface that faces the second outer surface. The light-transmitting segment of the side light guide member has a light-reflecting surface that is opposite to the side light-projecting surface and that is capable of reflecting light emitted from the side marker lighting element toward the side light-projecting surface such that the light is transmitted via the light-receiving segment and the light-transmitting segment of the side light guide member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
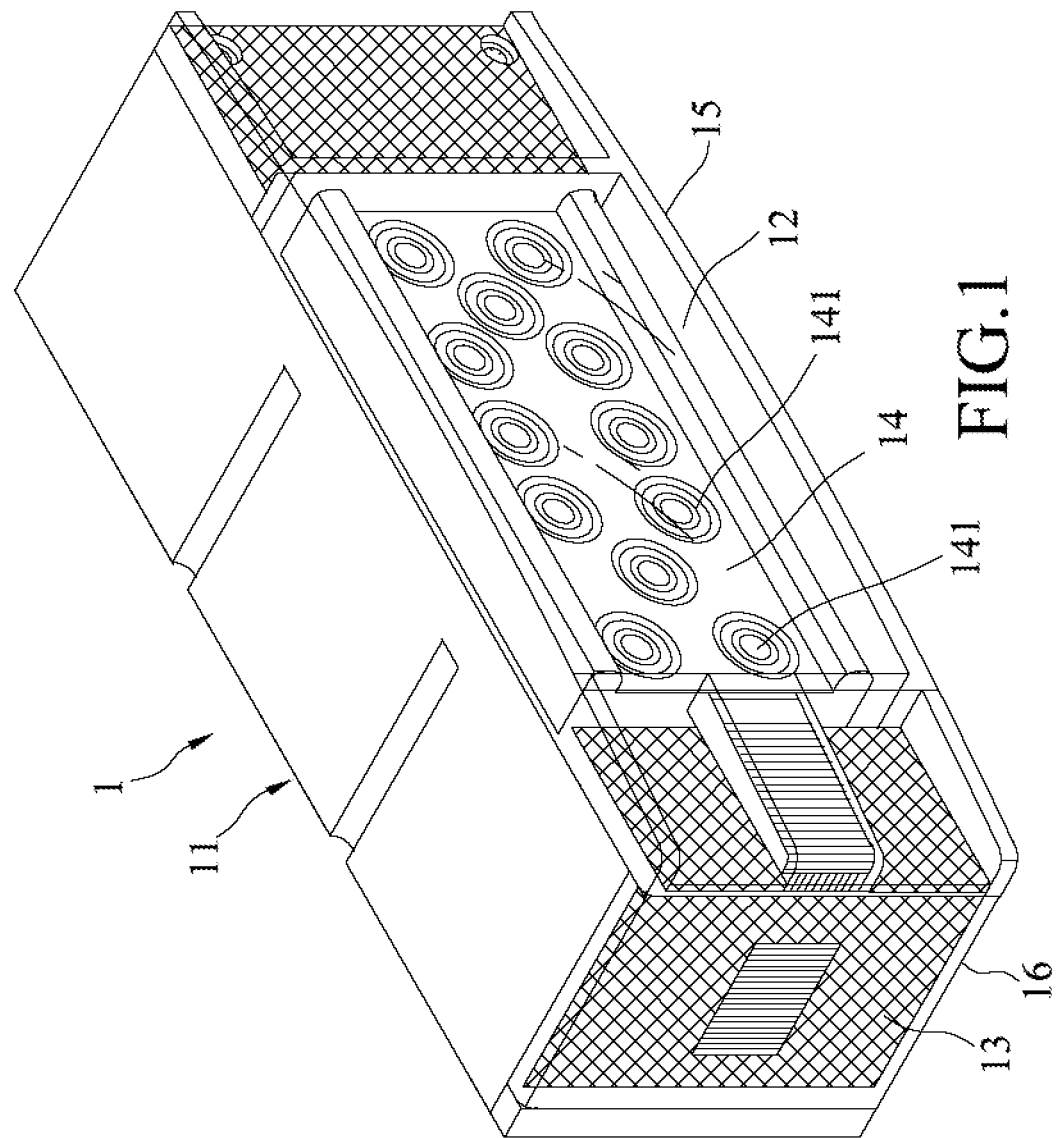
FIG. 1 is a perspective view of a first embodiment of a vehicle light apparatus according to the disclosure.
Figure 2:
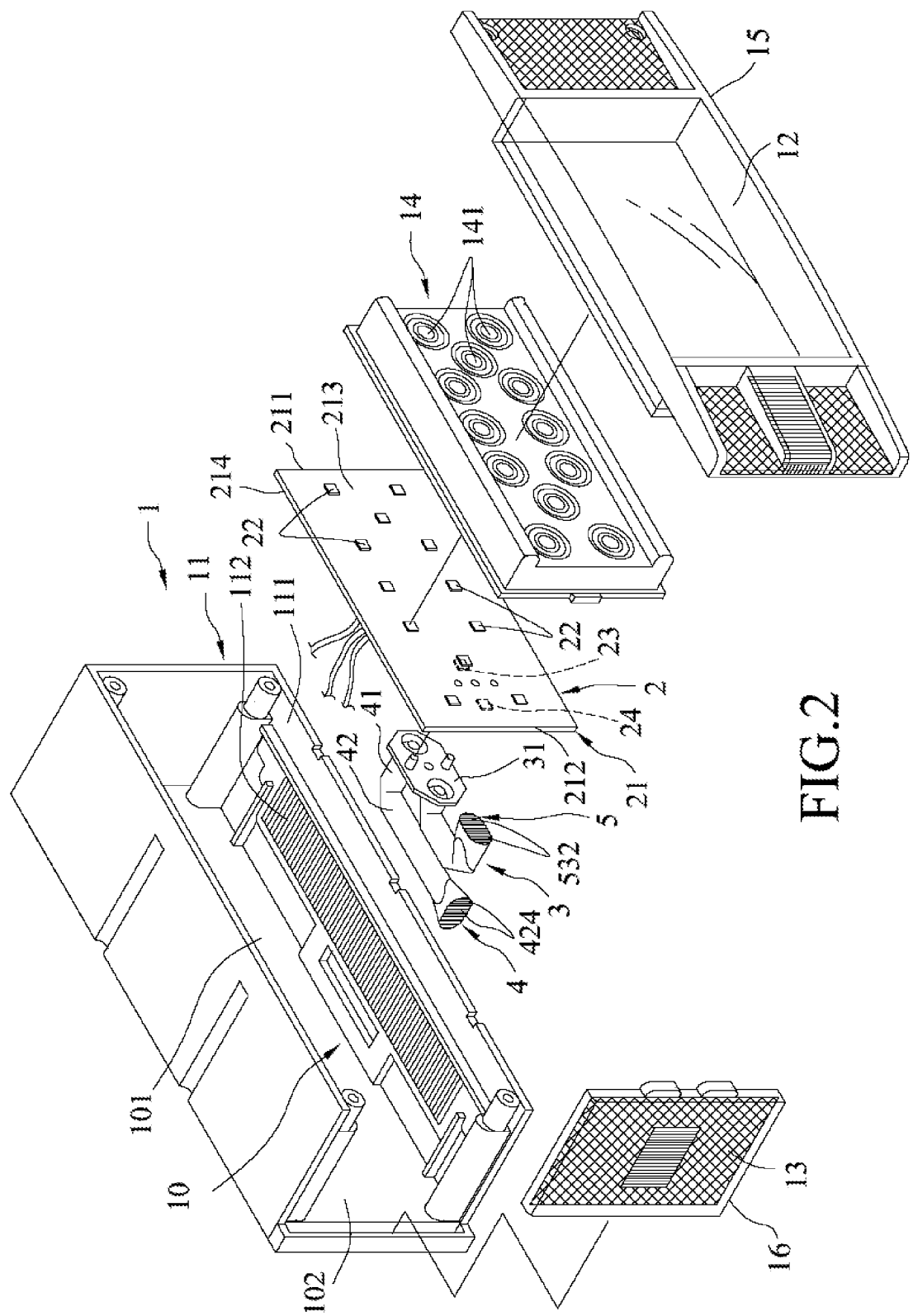
FIG. 2 is an exploded perspective view of the first embodiment.
Figure 3:
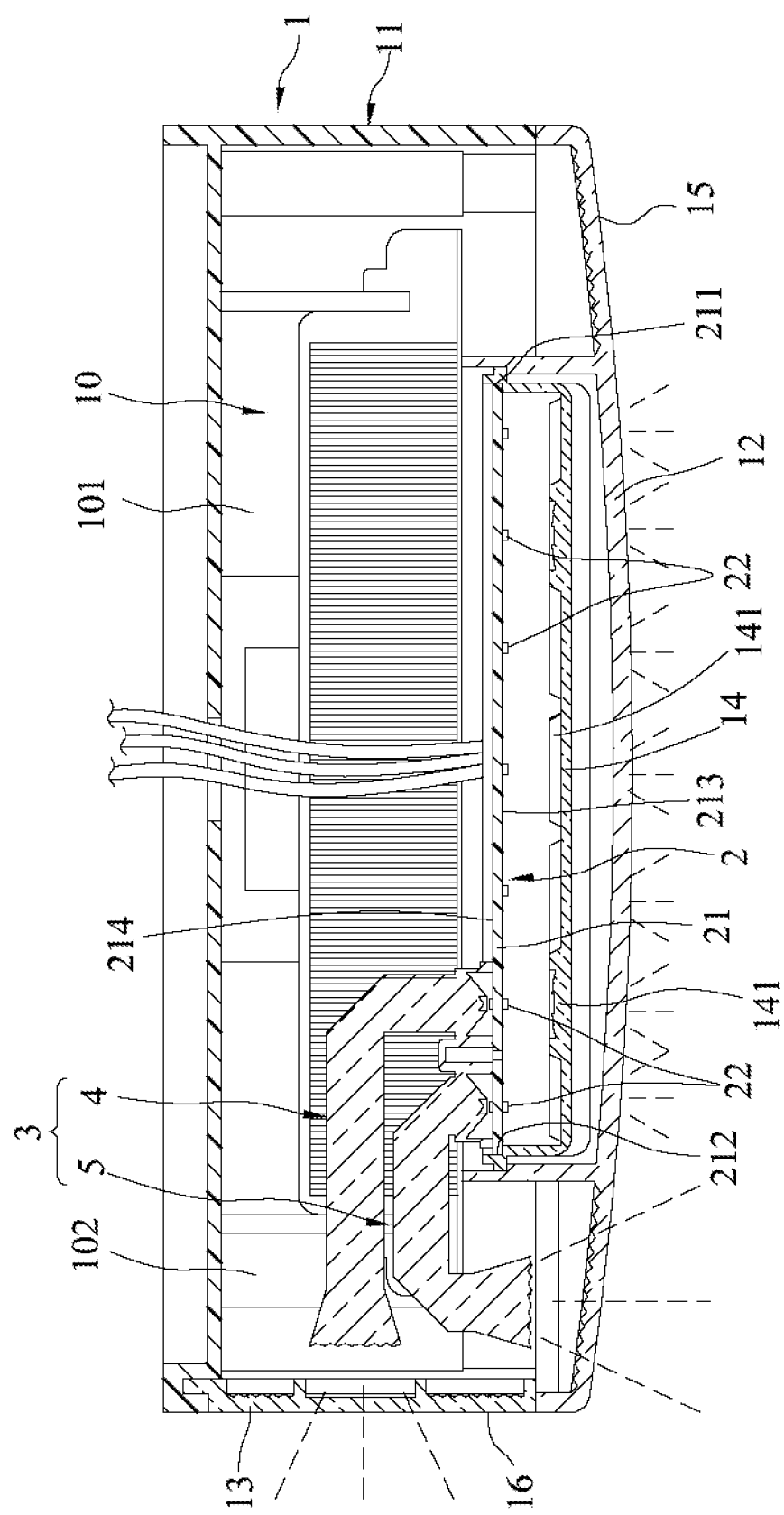
FIG. 3 is a sectional view of the first embodiment, in which the dotted lines indicate the directions of light.
Figure 4:
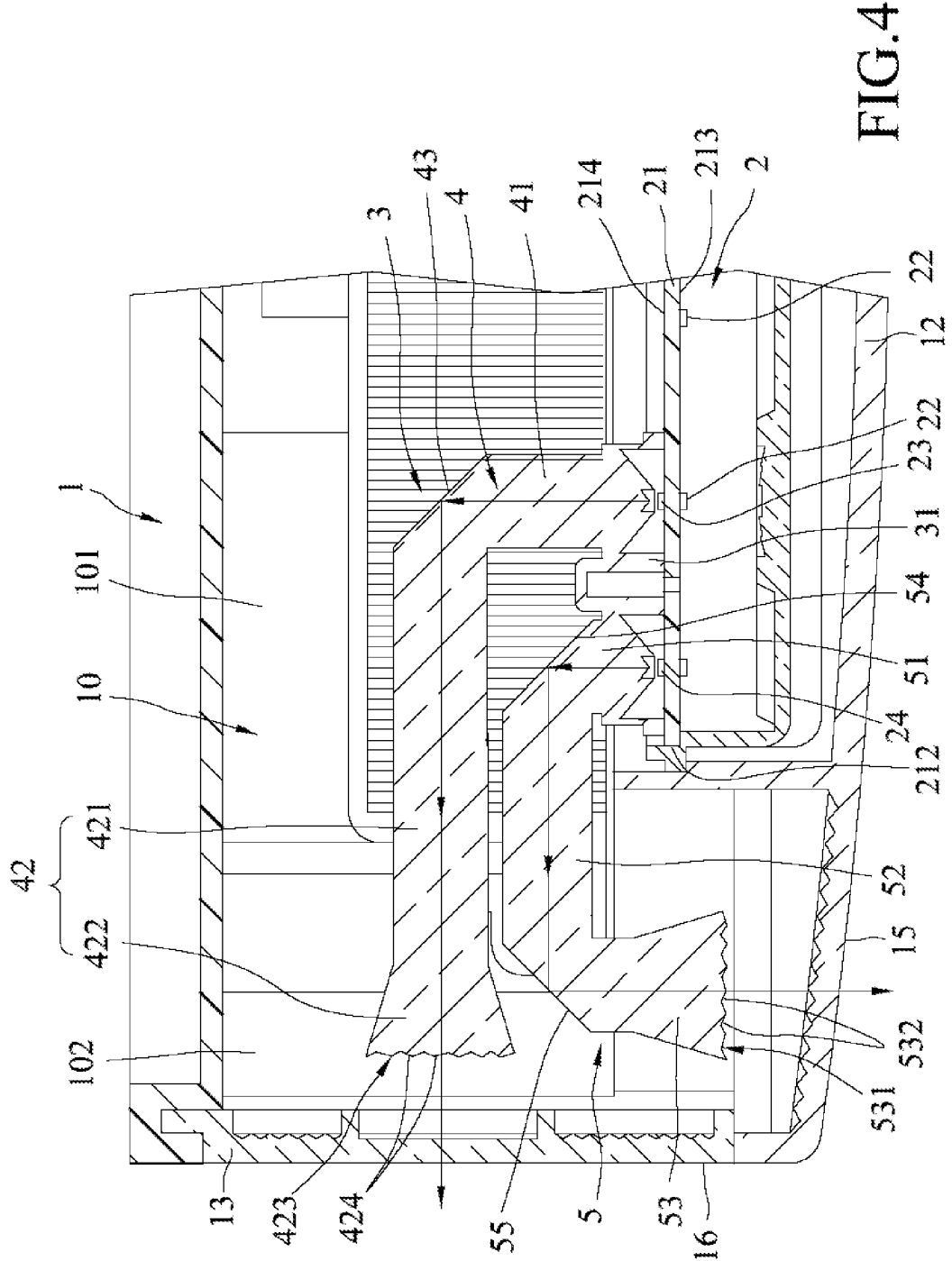
FIG. 4 is a fragmentary enlarged view of the first embodiment of FIG. 3, in which the arrows indicate the light transmitting paths.

Before the disclosure is described in greater detail, it should be noted that like elements are denoted by the same reference numerals throughout the disclosure.

Referring to FIGS. 1 to 4, a first embodiment of a vehicle light apparatus is adapted to be mounted to a vehicle (not shown). The vehicle light apparatus includes a light housing unit 1, a light-emitting module 2 and a light guiding unit 3. The light housing unit 1 includes a light housing 11 that defines a chamber 10 having a main space portion 101 and a side space portion 102 aligned with the main space portion 101 along a left-right direction. The light housing 11 includes a first outer surface 15 aligned with the chamber 10 along a front-rear direction, and a second outer surface 16 aligned with the chamber 10 along the left-right direction and adjacent to the side space portion 102, and a bottom wall 111 having a light-passing region 112 for permitting a part of the light emitted from the light-emitting module 2 to be transmitted downwardly so as to illuminate a license plate (not shown) of the vehicle.

The light housing unit 1 further includes a main lens 12 disposed on the first outer surface 15 of the light housing 11, a side lens 13 disposed on the second outer surface 16, and a lens holder 14 disposed between the light-emitting module 2 and the main lens 12, and having a plurality of spaced-apart lens portions 141 with specific light-guiding designs for properly directing and distributing the light. Since configuration of the light housing unit 1 is not a main feature of this disclosure, further details of the same will not be provided herein for the sake of brevity.

The light-emitting module 2 is disposed in and occupies only the main space portion 101 of the chamber 10. The light-emitting module 2 includes a circuit board 21, a plurality of main lighting elements 22, a side marker lighting element 23 and an auxiliary lighting element 24.

The circuit board 21 has a first side surface 213 facing the first outer surface 15 of the light housing 11, a second side surface 214 opposite to the first side surface 213, and opposite first and second lateral surfaces 211,212 interconnecting the first and second side surfaces 213,214. The second lateral surface 212 is adjacent to the second outer surface 16 of the light housing 11.

The main lighting elements 22 are mounted to the first side surface 213 of the circuit board 21 and face the first outer surface 15 so that light emitted from the main lighting elements 22 is transmitted through the lens holder 14 and projected out of the main lens 12.

The side marker lighting element 23 and the auxiliary lighting element 24 are disposed adjacent to the second lateral surface 212 of the circuit board 21, and are mounted to the second side surface 214 such that light is emitted from the side marker lighting element 23 and the auxiliary lighting element 24 along the front-rear direction and away from the first outer surface 15. The auxiliary lighting element 24 is closer to the second lateral surface 212 than the side marker lighting element 23.

The main lighting elements 22, the side marker lighting element 23 and the auxiliary lighting element 24 are, but not limited to, light emitting diodes. In other variations of this embodiment, the light-emitting module 2 may only include one main lighting element 22.

The light guiding unit 3 is disposed on the second side surface 214 of the circuit board 21 and in the chamber 10, and is made of a plastic material having light transmission function. The light guiding unit 3 includes a side light guide member 4, an auxiliary light guide member 5 and a mounting seat 31.

The side light guide member 4 is disposed adjacent to the second lateral surface 212, and includes a light-receiving segment 41 and a light-transmitting segment 42. The light-receiving segment 41 extends from the side marker lighting element 23 away from the first outer surface 15. The light-transmitting segment 42 extends from the light-receiving segment 41 of the side light guide member 4 toward the second outer surface 16 of the light housing 11, that is, the light-transmitting segment 42 is partially positioned in the main space portion 101 of the chamber 10, and partially positioned in the side space portion 102 of the chamber 10. The light-transmitting segment 42 has a side light-projecting surface 423 adjacent to and facing the second outer surface 16. In greater detail, the light-transmitting segment 42 has a transmission portion 421 extending along the left-right direction and connected to the light-receiving segment 41, and a projection portion 422 connected to the transmission portion 421 and adjacent to the second outer surface 16 of the light housing 11. The projection portion 422 is shaped like a horn and has a cross-sectional area that is gradually increased in a direction toward the side light-projecting surface 423.

The light-transmitting segment 42 of the side light guide member 4 further has a flat light-reflecting surface 43 that is opposite to the side light-projecting surface 423 in the left-right direction, that is inclined with respect to the front-rear direction and the left-right direction, and that is capable of reflecting light emitted from the side marker lighting element 23 toward the side light-projecting surface 423 such that the light is transmitted via the light-receiving segment 41 and the light-transmitting segment 42 of the side light guide member 4. To be more specific, the light-reflecting surface 43 faces the side marker lighting element 23 and the side light-projecting surface 423.

The side light guide member 4 further includes a plurality of parallel ribs 424 formed on the side light-projecting surface 423 and extending along an up-down direction. The parallel ribs 424 protrude toward the second outer surface 16 of the light housing 11 so as to distribute uniformly the light reflected by the light-reflecting surface 43.

The auxiliary light guide member 5 is disposed in the chamber 10 of the light housing unit 1, and is capable of transmitting light emitted from the auxiliary lighting element 24 toward the first outer surface 15 of the light housing 11. The auxiliary light guide member 5 includes a light-receiving segment 51, an intermediate segment 52 and a light-transmitting segment 53.

The light-receiving segment 51 of the auxiliary light guide member 5 extends from the auxiliary lighting element 24 away from the first outer surface 15 of the light housing 11. The intermediate segment 52 extends from the light-receiving segment 51 toward the second outer surface 16. The light-transmitting segment 53 of the auxiliary light guide member 5 extends from an end portion of the intermediate segment 52 that is opposite to the light-receiving segment 51 in the left-right direction toward the first outer surface 15, and has a light-projecting surface 531 adjacent to and facing the first outer surface 15. In greater detail, the light-transmitting segment 53 of the auxiliary light guide member 5 has a cross-sectional area that is gradually increased in a direction toward the light-projecting surface 531.

The intermediate segment 52 of the auxiliary light guide member 5 has opposite end portions respectively having a first light-reflecting surface 54 that is capable of reflecting the light emitted from the auxiliary lighting element 24 toward the light-transmitting segment 53 of the auxiliary light guide member 5, and a second light-reflecting surface 55 that is capable of reflecting the light reflected by the first light-reflecting surface 54 toward the light-projecting surface 531. Each of the first and second light-reflecting surfaces 54, 55 of the auxiliary light guide member 5 is flat, and is inclined with respect to the front-rear direction and the left-right direction.

The auxiliary light guide member 5 further includes a plurality of parallel ribs 532 formed on the light-projecting surface 531 and extending along the up-down direction. The parallel ribs 532 protrude toward the first outer surface 15 of the light housing 11 so as to distribute uniformly the light reflected by the second light-reflecting surface 55.

The mounting seat 31 is mounted to the second side surface 214 of the circuit board 21, and is integrally formed with the side light guide member 4 and the auxiliary light guide member 5 so as to permit the side light guide member 4 and the auxiliary light guide member 5 to be securely mounted to the circuit board 21.

When in use, the light emitted from the side marker lighting element 23 is transmitted through the light-receiving segment 41 of the side light guide member 4, reflected by the light-reflecting surface 43 and transmitted through the light-transmitting segment 42, and finally projected out of the side lens 13 through the side light-projecting surface 423. The shape of the projection portion 422 of the light-transmitting segment 42 allows for an increase of the illuminated area. The light emitted from the auxiliary lighting element 24 is transmitted through the light-receiving segment 51 of the auxiliary light guide member 5, reflected by the first light-reflecting surface 54 and transmitted through the intermediate segment 52, and further redirected by the second light-reflecting surface 55 and transmitted through the light-transmitting segment 53, and finally projected out of the main lens 12 through the light-projecting surface 531. The shape of the light-transmitting segment 53 of the auxiliary light guide member 5 allows for an increase of the illuminated area.

In this embodiment, the main lighting elements 22 serve as brake light, back-up light or tail light which has a warning function. The side marker lighting element 23 serves as a side marker light, and the auxiliary lighting element 24 serves as a clearance light. Alternatively, in other variations of this embodiment, the lighting elements of the light-emitting module 2 may also serve as turn signal light and/or other type of warning light.

Each of the side light guide member 4 and the auxiliary light guide member 5 is configured to enable proper collection and redirection of the light to a desired direction and to illuminate a targeted area, and is capable of long-distance illumination. Each of the side light guide member 4 and the auxiliary light guide member 5 may only occupy a relatively small space to achieve effective and proper collection and redirection of the light, and is designed and configured in such a way that the circuit board 21 occupies only the main space portion 101 of the chamber 10 of the light housing unit 1, thus reducing the overall size of the vehicle light apparatus as compared to the above-mentioned prior art.

Figure 5:
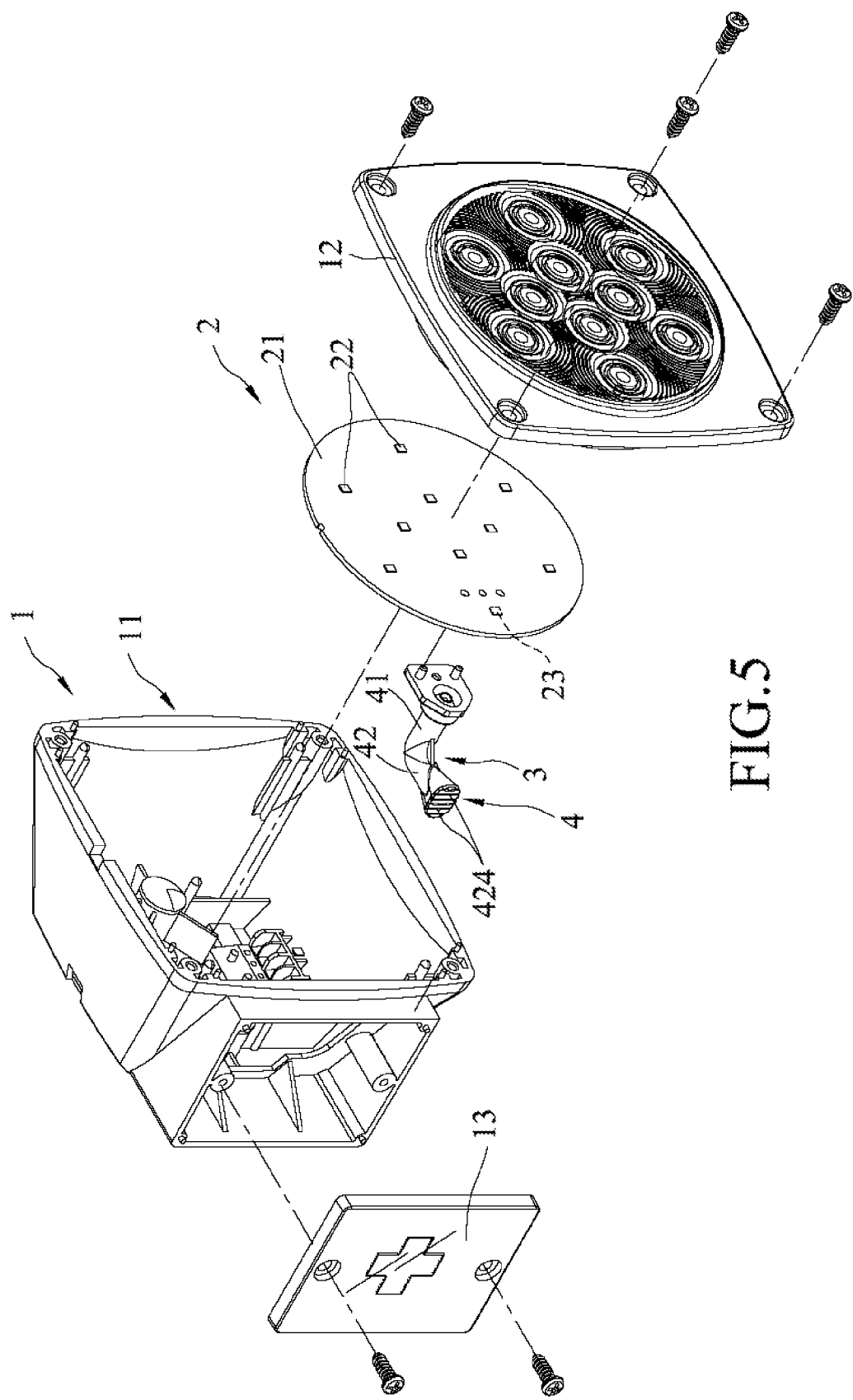
FIG. 5 is an exploded perspective view of a second embodiment of the vehicle light apparatus according to the disclosure.
Figure 6:
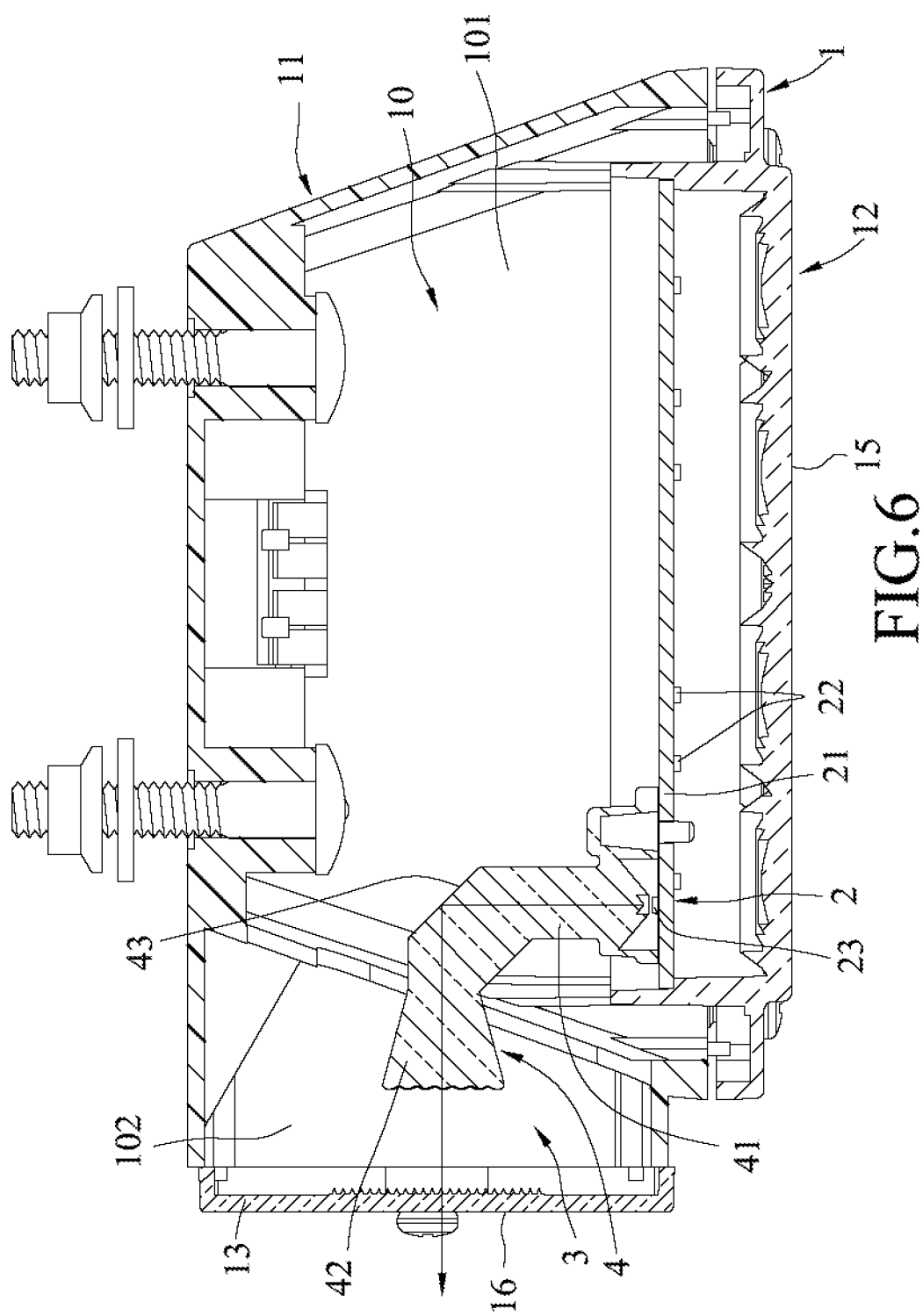
FIG. 6 is a sectional view of the second embodiment.

Referring to FIGS. 5 and 6, a second embodiment of the vehicle light apparatus according to the disclosure is shown to be similar in construction to that of the first embodiment. The difference between the first and second embodiments resides in that the auxiliary light guide member 5 and the auxiliary lighting element 24 are omitted in the second embodiment.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vehicle light apparatus comprising:
   a light housing unit defining a chamber, said light housing unit including a first outer surface aligned with said chamber along a front-rear direction, and a second outer surface aligned with said chamber along a left-right direction;
   a light-emitting module disposed in said chamber of said light housing unit and including a circuit board, at least one main lighting element that is mounted to said circuit board and that faces said first outer surface, and a side marker lighting element that is mounted to said circuit board, said circuit board having a first side surface facing said first outer surface, a second side surface opposite to said first side surface, and opposite first and second lateral surfaces interconnecting said first and second side surfaces, said second lateral surface being adjacent to said second outer surface of said light housing unit; and
   a light guiding unit disposed in said chamber and including a side light guide member that is adjacent to said second lateral surface and that includes a light-receiving segment extending from said side marker lighting element in a direction away from said first outer surface, and a light-transmitting segment extending from said light-receiving segment of said side light guide member toward said second outer surface of said light housing unit, and having a side light-projecting surface that faces said second outer surface, said light-transmitting segment of said side light guide member having a light-reflecting surface that is opposite to said side light-projecting surface and that is capable of reflecting light emitted from said side marker lighting element toward said side light-projecting surface such that the light is transmitted via said light-receiving segment and said light-transmitting segment of said side light guide member.

2. The vehicle light apparatus as claimed in claim 1, wherein said main lighting element of said light-emitting module is mounted to said first side surface of said circuit board, said side marker lighting element being mounted to said second side surface of said circuit board, said light guiding unit being disposed on said second side surface.

3. The vehicle light apparatus as claimed in claim 1, wherein said light-transmitting segment of said side light guide member has a transmission portion extending along the left-right direction and connected to said light-receiving segment of said side light guide member, and a projection portion connected to said transmission portion and adjacent to said second outer surface of said light housing unit, said side light-projecting surface being adjacent to said second outer surface, said projection portion having a cross-sectional area that is gradually increased in a direction toward said side light-projecting surface.

4. The vehicle light apparatus as claimed in claim 3, wherein said side light guide member further includes a plurality of parallel ribs formed on said side light-projecting surface and protruding toward said second outer surface of said light housing unit.

5. The vehicle light apparatus as claimed in claim 1, wherein said light-reflecting surface of said side light guide member is flat, and is inclined with respect to the front-rear direction and the left-right direction.

6. The vehicle light apparatus as claimed in claim 1, wherein said light-emitting module further includes an auxiliary lighting element mounted to said circuit board and adjacent to said second lateral surface, said light guiding unit further including an auxiliary light guide member that is disposed in said chamber of said light housing unit and that is capable of transmitting light emitted from said auxiliary lighting element toward said first outer surface of said light housing unit.

7. The vehicle light apparatus as claimed in claim 6, wherein said auxiliary lighting element is mounted to said second side surface of said circuit board, said auxiliary light guide member including a light-receiving segment that extends from said auxiliary lighting element in a direction away from said first outer surface, an intermediate segment that extends from said light-receiving segment of said auxiliary light guide member toward said second outer surface of said light housing unit, and a light-transmitting segment that extends from an end portion of said intermediate segment, which is opposite to said light-receiving segment, in a direction toward said first outer surface, and that has a light-projecting surface adjacent to and facing said first outer surface.

8. The vehicle light apparatus as claimed in claim 7, wherein said intermediate segment has opposite end portions respectively having a first light-reflecting surface that is capable of reflecting the light emitted from said auxiliary lighting element toward said light-transmitting segment of said auxiliary light guide member, and a second light-reflecting surface that is capable of reflecting the light reflected by said first light-reflecting surface toward said light-projecting surface.

9. The vehicle light apparatus as claimed in claim 7, wherein said light-transmitting segment of said auxiliary light guide member has a cross-sectional area that is gradually increased in a direction toward said light-projecting surface.

10. The vehicle light apparatus as claimed in claim 7, wherein said auxiliary light guide member further includes a plurality of parallel ribs formed on said light-projecting surface of said auxiliary light guide member and protruding toward said first outer surface of said light housing unit.

11. The vehicle light apparatus as claimed in claim 8, wherein each of said first and second light-reflecting surfaces of said auxiliary light guide member is flat, and is inclined with respect to the front-rear direction and the left-right direction.

\* \* \* \* \*